US010984066B2

(12) United States Patent
Korobov et al.

(10) Patent No.: US 10,984,066 B2
(45) Date of Patent: Apr. 20, 2021

(54) SYSTEM AND METHOD FOR A WEB SCRAPING TOOL AND CLASSIFICATION ENGINE

(71) Applicant: Zyte Group Limited, Ballincollig (IE)

(72) Inventors: Mikhail Korobov, Ballincollig (IE); Konstantin Lopukhin, Ballincollig (IE)

(73) Assignee: Zyte Group Limited, Cork (IE)

( * ) Notice: Subject to any disclaimer, the term of this patent is extended or adjusted under 35 U.S.C. 154(b) by 57 days.

(21) Appl. No.: 16/279,504

(22) Filed: Feb. 19, 2019

(65) Prior Publication Data

US 2020/0210511 A1 Jul. 2, 2020

Related U.S. Application Data

(60) Provisional application No. 62/787,642, filed on Jan. 2, 2019.

(51) Int. Cl.
*G06F 16/957* (2019.01)
*G06N 3/08* (2006.01)
*G06F 16/55* (2019.01)
*G06F 16/951* (2019.01)

(52) U.S. Cl.
CPC .......... *G06F 16/9577* (2019.01); *G06F 16/55* (2019.01); *G06F 16/951* (2019.01); *G06N 3/08* (2013.01)

(58) Field of Classification Search
CPC ...... G06F 16/55; G06F 16/951; G06F 16/957; G06F 16/9577; G06N 3/08; G06K 9/6273; G06K 9/6293
See application file for complete search history.

(56) References Cited

U.S. PATENT DOCUMENTS

| 10,223,616 B1* | 3/2019 | Malin | G06N 3/08 |
| 10,296,552 B1* | 5/2019 | Malin | G06F 16/9536 |
| 2002/0067857 A1* | 6/2002 | Hartmann | G06F 16/5838 382/224 |
| 2011/0035345 A1* | 2/2011 | Duan | G06K 9/6256 706/12 |
| 2012/0159620 A1* | 6/2012 | Seifert | H04L 63/1416 726/22 |

(Continued)

FOREIGN PATENT DOCUMENTS

| EP | 3382575 A1 | 10/2018 |
| WO | 2017165774 A1 | 9/2017 |

OTHER PUBLICATIONS

Kalva et al. "Web image classification based on the fusion of image and text classifiers." Ninth International Conference on Document Analysis and Recognition (ICDAR 2007). vol. 1. IEEE, 2007. (Year: 2007).*

(Continued)

*Primary Examiner* — Katrina R Fujita
(74) *Attorney, Agent, or Firm* — Ohlandt, Greeley, Ruggiero & Perle, LLP

(57) ABSTRACT

A web scaping system configured with artificial intelligence and image object detection. The system processes a web page with a neural network to perform object detection to obtain structured data, including text, image and other kinds of data, from web pages. The neural network allows the system to efficiently process visual information (including screenshots), text content and HTML structure to achieve good quality and decrease extraction time.

32 Claims, 4 Drawing Sheets

(56) References Cited

U.S. PATENT DOCUMENTS

| | | | | |
|---|---|---|---|---|
| 2016/0364419 | A1* | 12/2016 | Stanton | G06N 3/0454 |
| 2017/0168996 | A1 | 6/2017 | Dou et al. | |
| 2018/0137197 | A1 | 5/2018 | Kumar et al. | |
| 2019/0065589 | A1* | 2/2019 | Wen | G06F 16/951 |
| 2019/0095753 | A1* | 3/2019 | Wolf | G06K 9/6217 |
| 2019/0258933 | A1* | 8/2019 | Baughman | H04L 67/025 |
| 2020/0050707 | A1* | 2/2020 | Tsykynovskyy | G06F 16/951 |

OTHER PUBLICATIONS

Gogar et al. "Deep neural networks for web page information extraction." IFIP International Conference on Artificial Intelligence Applications and Innovations. Springer, Cham, 2016. (Year: 2016).*

Li et al. "Identifying Gambling and Porn Websites with Image Recognition." Pacific Rim Conference on Multimedia. Springer, Cham, 2017. (Year: 2017).*

Marchal et al. "Know your phish: Novel techniques for detecting phishing sites and their targets." 2016 IEEE 36th International Conference on Distributed Computing Systems (ICDCS). IEEE, 2016. (Year: 2016).*

International Search Report and Written Opinion for corresponding International Application PCT/IB2020/000025, 15 pages, dated Jun. 16, 2020.

* cited by examiner

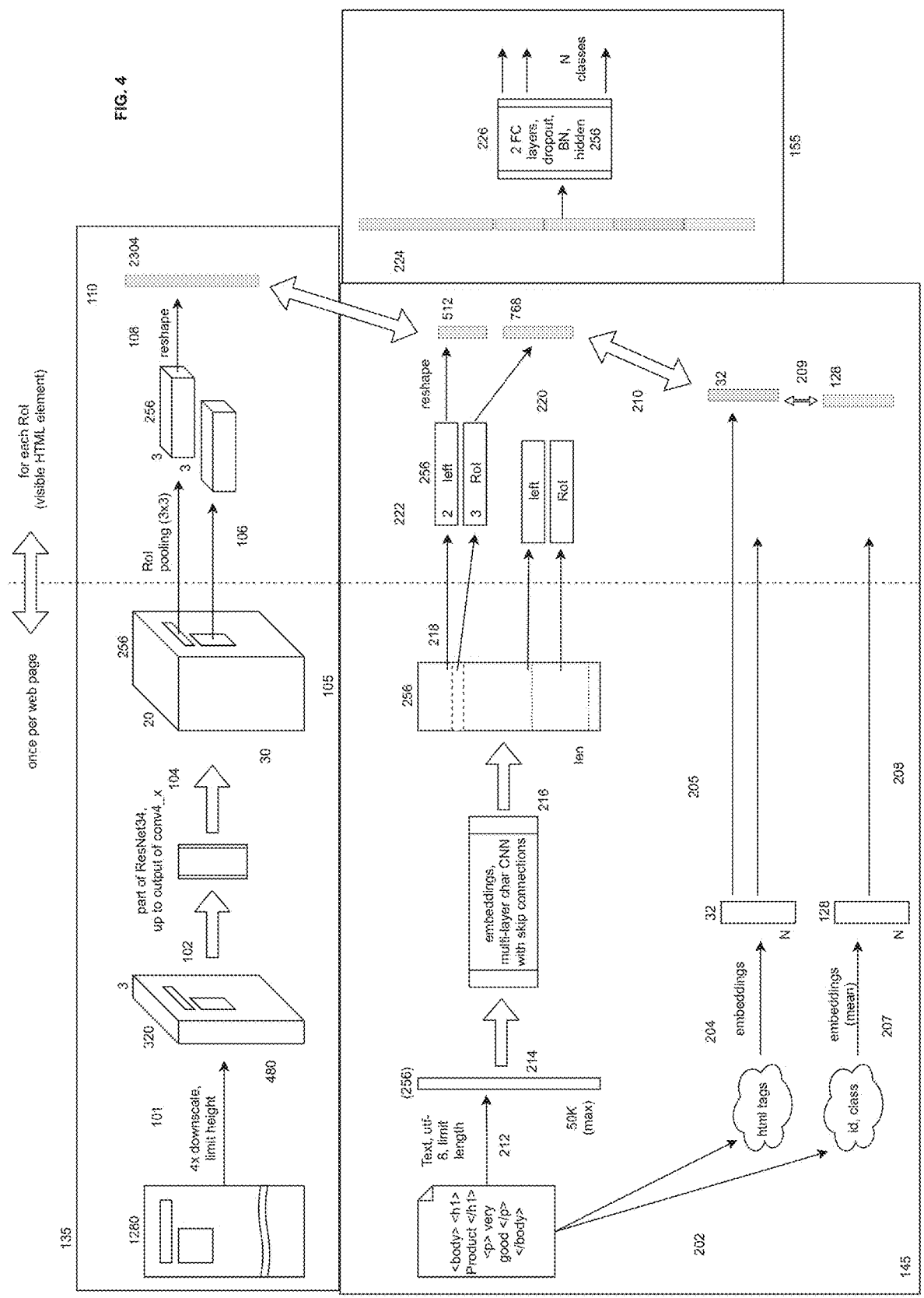

SYSTEM AND METHOD FOR A WEB SCRAPING TOOL AND CLASSIFICATION ENGINE

CROSS REFERENCE TO RELATED APPLICATION

The present application claims priority to U.S. Provisional Patent Application No. 62/787,642 filed on Jan. 2, 2019, the entirety of which is incorporated herein by reference.

BACKGROUND

Software that extracts structured information from the web automatically is conventionally handled by creating custom crawlers ("spiders") for each website being crawled using manually specified rules. ScrapingHub is a creator and maintainer of the most popular open-source framework for creating such spiders (Scrapy). While this approach works, conventional crawlers require development and maintenance efforts for each website, which is slow, costly, and does not scale well to a large number of websites.

SUMMARY

Described herein are embodiments of technology to obtain structured data, including text, image and other kinds of data, from web pages, and process them for, among other advantages, more efficient web crawling, website analysis, creating knowledge databases and graphs, and providing more useful web page representation for other automated web page processing components. For example, embodiments described herein include machine learning components employing Deep Learning to extract and classify information from web pages. Embodiments also include a multi-modal neural network architecture that processes visual information (including screenshots), text content and HTML structure at the same time to achieve good quality and to do so efficiently to decrease extraction time.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein:

FIG. 4 is a flowchart and architecture for a process in accordance with at least another one of the various embodiments.

DETAILED DESCRIPTION OF THE EMBODIMENTS

Figure 1:
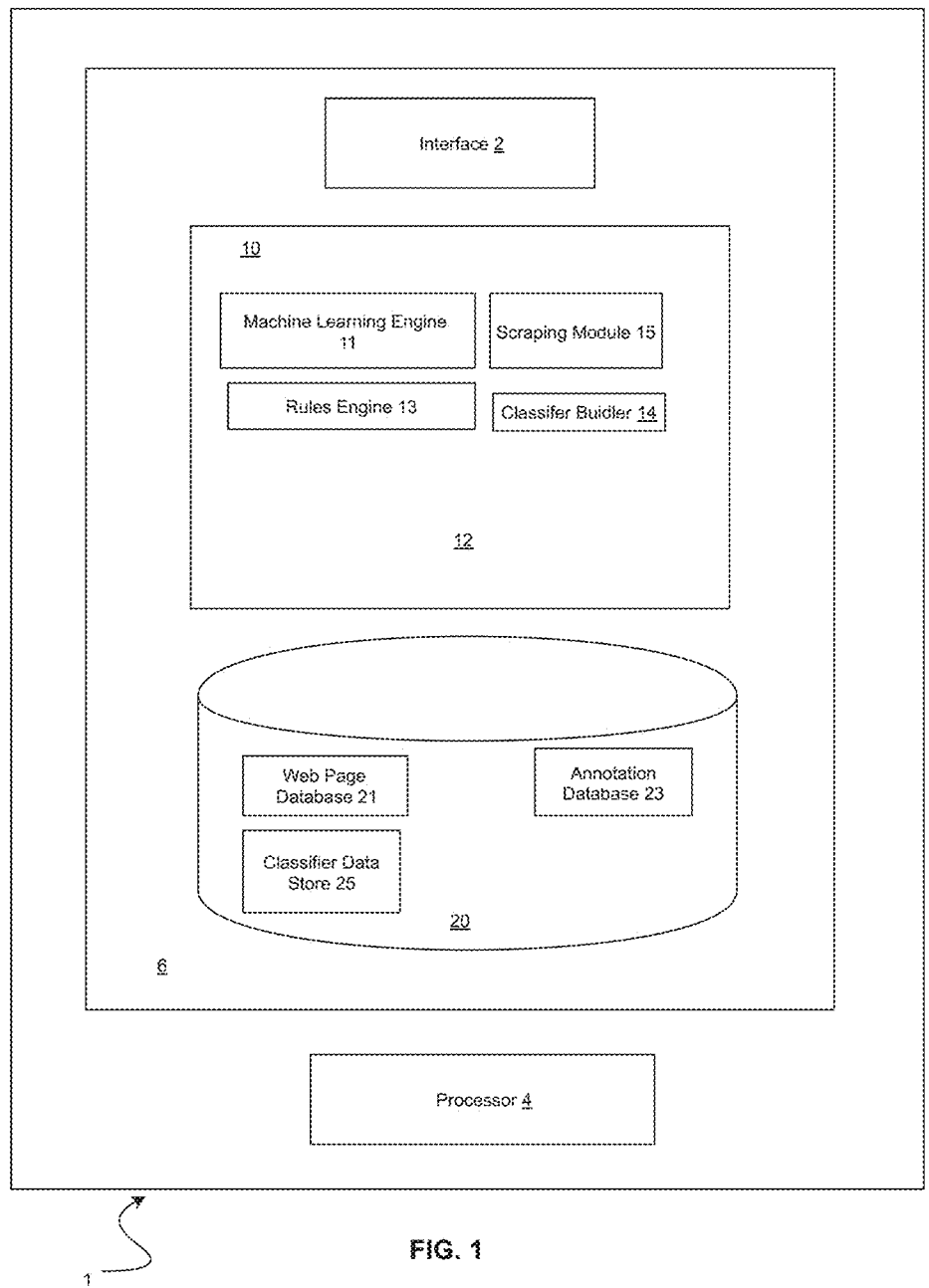
FIG. 1 shows an embodiment of a computer that can be included in a system such as that shown in FIG. 2.

Various embodiments now will be described more fully hereinafter with reference to the accompanying drawings, which form a part hereof, and which show, by way of illustration, specific embodiments by which the innovations described herein can be practiced. The embodiments can, however, be embodied in many different forms and should not be construed as limited to the embodiments set forth herein. Rather, these embodiments are provided so that this disclosure will be thorough and complete, and will fully convey the scope of the embodiments to those skilled in the art. Among other things, the various embodiments can be methods, systems, media, or devices. Accordingly, the various embodiments can take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application. The phrase "in an embodiment" or "in at least one of the various embodiments" as used herein does not necessarily refer to the same embodiment, though it can. Furthermore, the phrase "in another embodiment" as used herein does not necessarily refer to a different embodiment, although it can. Thus, as described below, various embodiments can be readily combined, without departing from the scope or spirit of the present disclosure.

In addition, as used herein, the term "or" is an inclusive "or" operator, and is equivalent to the term "and/or" unless the context clearly dictates otherwise. In addition, throughout the specification, the meaning of "a" "an" and "the" include plural references. The meaning of "in" includes "in" and "on."

The terms "operatively connected" and "operatively coupled", as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and can be within a single module or device or between one or more remote modules or devices.

For example, a computer hosting a web scraping and classification engine can communicate to a computer hosting one or more classifier programs, websites, and/or event databases via local area networks, wide area networks, direct electronic or optical cable connections, dial-up telephone connections, or a shared network connection including the Internet using wire and wireless based systems.

The following briefly describes embodiments to provide a basic understanding of some aspects of the innovations described herein. This brief description is not intended as an extensive overview. It is not intended to identify key or critical elements, or to delineate or otherwise narrow the scope. Its purpose is merely to present some concepts in a simplified form as a prelude to the more detailed description that is presented later.

Described herein are embodiments of technology to obtain structured data, including text, image and other kinds of data, from web pages, and process them for, among other advantages, more efficient web crawling, website analysis, creating knowledge databases and graphs, and providing more useful web page representation for other automated web page processing components. For example, embodiments as described herein include machine learning components employing Deep Learning to extract and classify information from web pages. Embodiments also include a multi-modal neural network architecture which processes visual information (including screenshots), text content and HTML structure at the same time to achieve good quality and to do so efficiently to decrease extraction time.

Briefly stated, various embodiments are directed to systems and methods for scraping and classifying web pages.

In at least one of the various embodiments, there is provided a system for scraping and processing a web page. The system comprises a memory including non-transitory program memory for storing at least instructions and a processor device that is operative to execute instructions that enable actions comprising: obtaining an image of a web page; processing the web page with an object detection neural net to obtain feature vectors for one or more image regions of interest on the image of the web page; extracting HTML text from the web page; processing the HTML text from the web page with the neural net to obtain feature vectors for one or more HTML regions of interest; and classifying the one or more image regions of interest and the one or more HTML regions of interest with a classifier.

In at least one embodiment, the system can be configured so that one or more image regions of interest and the one or more HTML regions of interest can be generated based on measurements performed inside a web browser engine.

In at least one embodiment, the system can be configured so that the one or more image regions of interest and the one or more HTML regions of interest can point to the same or overlapping parts of a web page, and the classifier combines feature vectors from the one or more image regions of interest and the one or more HTML regions of interest to classify parts of web page, to obtain one or more classes for each part of the web page.

In at least one embodiment, the image object detection neural network and the HTML processing neural network can be combined into a single neural network computation graph and trained jointly. In at least one embodiment, the image object detection neural network, the HTML processing neural network and the classifier can be combined into a single neural network computation graph and trained jointly.

In at least one embodiment, the system can be configured to: resize the image of the web page and process the web page with the neural net to produce an image feature map representing the web page with the image feature map comprising the one or more image regions of interest mapped to the image feature map, and process each of the one or more regions of interest of the image feature map into one or more image region of interest parameters for classification by the classifier.

In at least one embodiment, the system can be configured to: process the HTML text and structural information from the web page with the neural net to produce an HTML feature map representing the web page with the HTML feature map comprising the one or more HTML regions of interest mapped to the HTML feature map; and process each of the one or more HTML regions of interest of the HTML feature map into one or more of HTML region of interest parameters for classification by the classifier. In at least one embodiment, the neural net for processing the resized image of the web page can comprise a convolutional neural net. In at least one embodiment, the convolutional neural net can be Residual Neural Net. In at least one embodiment, the neural net for processing HTML text and structure can be a convolutional neural net or a recurrent neural net. In at least one embodiment, image regions of interest can be processed into image region of interest parameters for classification using region of interest pooling. In at least one embodiment, HTML regions of interest can be processed into HTML region of interest parameters for classification using region of interest pooling.

In at least one embodiment, the system can be configured to extract textual content from the web page HTML prior to processing the HTML text with the neural net.

In at least one embodiment, the system can be configured to output a probability score that a part of a web page belongs to a defined class.

In at least one embodiment, the classifier can be selected from at least one of a logistic regression classifier, a decision tree, a conditional random field, a propositional rule learner, or a neural network.

In at least one embodiment, the system can be configured to perform the image processing and the HTML processing in parallel.

At least one embodiment is a method for scraping and processing a web page. The method is performed by a computer system that comprises one or more processors and a computer-readable storage medium encoded with instructions executable by at least one of the processors and operatively coupled to at least one of the processors. The method comprises: obtaining an image of a web page; processing the web page with an object detection neural net to obtain feature vectors for one or more image regions of interest on the image of the web page; extracting HTML text from the web page; processing the HTML text from the web page with the neural net to obtain feature vectors for one or more HTML regions of interest; and classifying the one or more image regions of interest and the one or more HTML regions of interest with a classifier.

In at least one embodiment, the method can further comprise generating the one or more image regions of interest and the one or more HTML regions of interest based on measurements performed inside a web browser engine.

In at least one embodiment, the method can comprise the one or more image regions of interest and the one or more HTML regions of interest are pointing to the same or overlapping parts of a web page, and the classifier uses combined feature vectors from the one or more image regions of interest and the one or more HTML regions of interest to classify parts of web page, to obtain one or more classes for each part of the web page.

In at least one embodiment, the method comprises combining the image object detection neural network and the HTML processing neural network into a single neural network computation graph and training the image object detection neural network and the HTML processing neural network jointly.

In at least one embodiment, the method comprises combining the image object detection neural network, the HTML processing neural network and the classifier into a single neural network computation graph and training the image object detection neural network, the HTML processing neural network, and the classifier jointly.

In at least one embodiment, the method comprises resizing the image of the web page and processing the web page with the neural net to produce an image feature map representing the web page. Also, the image feature map comprises the one or more image regions of interest mapped to the image feature map; and the method includes processing each of the one or more regions of interest of the image feature map into one or more image region of interest parameters for classification by the classifier.

In at least one embodiment, the method comprises processing the HTML text and structural information from the web page with the neural net to produce an HTML feature map representing the web page. Also, the HTML feature map comprises the one or more HTML regions of interest mapped to the HTML feature map; and the method includes processing each of the one or more HTML regions of interest of the HTML feature map into one or more of HTML region of interest parameters for classification by the classifier.

In at least one embodiment, the method comprises processing the resized image of the web page with a convolutional neural net. In at least one embodiment, the convolutional neural net can be a Residual Neural Net. In at least one embodiment, the neural net for processing HTML text and structure can be a convolutional neural net or a recurrent neural net.

In at least one embodiment, the image regions of interest can be processed into image region of interest parameters for classification using region of interest pooling. In at least one embodiment, the HTML regions of interest are processed into HTML region of interest parameters for classification using region of interest pooling.

In at least one embodiment, the method comprises extracting textual content from the web page HTML prior to processing the HTML text with the neural net.

In at least one embodiment, the method comprises outputting a probability score that a part of a web page belongs to a defined class.

In at least one embodiment, the method comprises performing the image processing and the HTML processing in parallel.

The present disclosure provides a computer program product comprising a computer-readable storage medium encoded with instructions that, when executed by at least one processor in a computer system that comprises one or more processors and a memory operatively coupled to at least one of the processors, cause the computer system at least to: obtain an image of a web page; process the web page with an object detection neural net to obtain feature vectors for one or more image regions of interest on the image of the web page; extract HTML text from the web page; process the HTML text from the web page with the neural net to obtain feature vectors for one or more HTML regions of interest; and classify the one or more image regions of interest and the one or more HTML regions of interest with a classifier. The instructions comprise instructions that, when executed by at least one of the processors, can cause the computer system at least to execute the method of the embodiments for scraping and processing a web page as described herein.

Illustrative Computer

FIG. 1 shows an embodiment of a system for web page and web page parts scraping, processing and classification of the present disclosure. In at least one embodiment, a system or a network computer, generally represented by reference numeral 1, comprises a network computer including a signal input/output, such as via a network interface or interface unit 2, for receiving input, such as URLs of pages, to extract data from or content of these pages, a processor 4 and memory 6 that includes program memory 10, all in communication with each other via a bus. In some embodiments, processor 4 can include one or more central processing units. In some embodiments, processor 4 can include additional hardware devices such as Graphical Processing Units (GPUs) or AI accelerator application-specific integrated circuits. As illustrated in FIG. 1, network computer 1 also can communicate with the Internet, or some other communications network, via network interface unit 2, which is constructed for use with various communication protocols including the TCP/IP protocol. Network interface unit 2 is sometimes known as a transceiver, transceiving device, or network interface card (NIC). Network computer 1 also comprises input/output interface for communicating with external devices, such as a keyboard, or other input or output devices not shown. Input/output interface can utilize one or more communication technologies, such as USB, infrared, Bluetooth™, or the like.

Memory 6 generally includes RAM, ROM and one or more permanent mass storage devices, such as hard disk drive, flash drive, SSD drive, tape drive, optical drive, and/or floppy disk drive. Memory 6 stores operating system for controlling the operation of network computer 1. Any general-purpose operating system can be employed. Basic input/output system (BIOS) is also provided for controlling the low-level operation of network computer 1. Memory 6 can include processor readable storage media 10. Program memory, that can be a processor readable storage media 10, can be referred to and/or include computer readable media, computer readable storage media, and/or processor readable storage device. Processor readable storage media 10 can include volatile, nonvolatile, removable, and non-removable media implemented in any method or technology for storage of information, such as computer readable instructions, data structures, program modules, or other data. Examples of processor readable storage media include RAM, ROM, EEPROM, SSD, flash memory or other memory technology, CD-ROM, digital versatile disks (DVD) or other optical storage, magnetic cassettes, magnetic tape, magnetic disk storage or other magnetic storage devices, or any other media that can be used to store the desired information and can be accessed by a computer.

Memory 6 further includes one or more data storage 20, which can be utilized by network computer to store, among other things, applications and/or other data. For example, data storage 20 can also be employed to store information that describes various capabilities of network computer 1. The information can then be provided to another computer based on any of a variety of events, including being sent as part of a header during a communication, sent upon request, or the like. Data storage 20 can also be employed to store messages, web page content, or the like. At least a portion of the information can also be stored on another component of network computer, including, but not limited to, processor readable storage media, hard disk drive, or other computer readable storage medias (not shown) in network computer 1.

Data storage 20 can include a database, text, spreadsheet, folder, file, or the like, that can be configured to maintain and store user account identifiers, user profiles, email addresses, IM addresses, and/or other network addresses, or the like.

In at least one embodiment, data storage 20 can include databases, which can contain information determined from one or more events for one or more entities.

Data storage 20 can further include program code, data, algorithms, and the like, for use by a processor, such as processor 4, to execute and perform actions. In one embodiment, at least some of data store 20 might also be stored on another component of network computer 1, including, but not limited to, processor readable storage media 10, hard disk drive, or the like.

System 1 includes a web scraping and classification engine 12. Web scraping and classification engine 12 includes a scraping module 15 and Machine Learning-based processing engine 11. Web scraping and classification engine 12 can also include rule-based processing engine 13. The web scraping and classification engine 12 can be arranged and configured to employ processes, or parts of processes, such as those described in conjunction with FIG. 3-4, to perform at least some of its actions. For example, in embodiments, the web scraping and classification engine 12 can be arranged and configured to employ processes, or parts of processes, for an image processing part, a text processing part, and a classifier such as those described in conjunction with FIG. 3-4, to perform at least some of its actions.

Scraping module 15 can include a program or algorithm for, when executed by the processor, performing some or all of these actions: rendering a web page in a web browser, downloading of the related resources like images or CSS files, executing JavaScript and other instructions, obtaining screenshots of web pages and its parts, measuring on-screen coordinates, colors, visibility, and other properties of HTML elements and other parts of web pages, obtaining final HTML representation of the web pages, and automatically executing commands to control the browser.

Web scraping and classification engine 12 can include Artificial Intelligence (AI) machine learning (ML)-based processing engine 11, including AI machine learning classification, which can be based on any of a number of known machine learning algorithms, including classifiers such as the classifiers described herein, for example, neural nets (including fully connected, convolutional and recurrent neural nets, or neural nets created as a combination of these blocks), decision trees, conditional random fields (CRFs), propositional rule learner, logistic regression, and the like). In at least one embodiment, ML-based processing engine 11 is implemented as a multi-modal neural network described herein in conjunction with FIGS. 3-4. ML-based processing engine can be separated into inference and training (classifier building) components, which can be employed at different points of time.

Web scraping and classification engine 12 can include rule-based classification and extraction module 13. If present, rule-based classification and extraction module 13 can process results of the scraping module 15, or process results of the Machine Learning-based processing engine 11, or combine results, or do all of these tasks, or any combination of these tasks.

System 1 also includes data storage memory 20 including a number of data stores 21, 23, 25 that can be hosted in the same computer or hosted in a distributed network architecture. System 1 includes a data store 21 for a set of processed web pages, which can contain images, HTML, measurement results and other metadata about web pages. System 1 can further include a data store for human-provided annotations 23, including examples of the desired classification and extraction results for a set of input web pages. System 1 includes a classifier component, ML-based processing engine 11, including a parameters and configuration classifier store 25 comprising a set of web page and web page parts classifiers, as well as a classifier model building (training) program 14 for, when executed by processor 4, training and evaluating ML algorithms for web page and web page part classification and extraction, and storing the resulting parameters and configurations in classifier store 25, using either training database of web pages 21, or a data store of human-provided annotations 23, or both as a training data. Classifier model building program 14 can be employed to build classifiers operable to classify other web pages and parts of web pages, including other web sites, based on learning from the previously classified web pages and parts of web pages.

Although FIG. 1 illustrates system 1 as a single network computer, the innovations described herein are not so limited. For example, one or more functions of system 1 can be distributed across one or more distinct network computers. Moreover, system or computer 1 is not limited to a particular configuration. Thus, in one embodiment, computer 1 has a plurality of network computers. In another embodiment, a network server computer 1 has a plurality of network computers that operate using a master/slave approach, where one of the plurality of network computers of network server computer is operative to manage and/or otherwise coordinate operations of the other network computers. In other embodiments, a network server computer 1 operates as a plurality of network computers arranged in a cluster architecture, a peer-to-peer architecture, and/or even within a cloud architecture. System 1 can be implemented on a general-purpose computer under the control of a software program and configured to include the technical innovations as described herein. Alternatively, system 1 can be implemented on a network of general-purpose computers and including separate system components, each under the control of a separate software program, or on a system of interconnected parallel processors, system 1 being configured to include the technical innovations as described herein. Thus, the innovations described herein are not to be construed as being limited to a single environment, and other configurations, and architectures are also envisaged.

Illustrative Operating Environment

Figure 2:
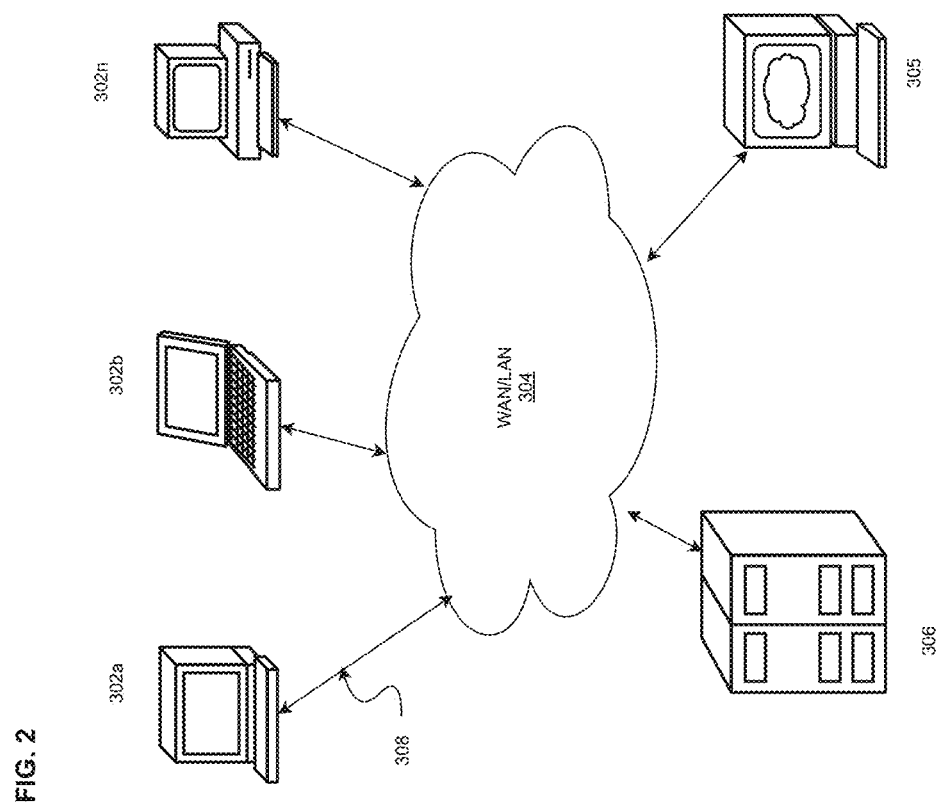
FIG. 2 is a logical architecture of a system for in accordance with at least one of the various embodiments.

FIG. 2 shows components of one embodiment of an environment in which embodiments of the innovations described herein can be practiced. Not all components are required to practice the innovations, and variations in the arrangement and type of the components can be made without departing from the spirit or scope of the innovations.

FIG. 2 shows a network environment 300 adapted to support the present disclosure. The exemplary environment 300 includes a network 304, and a plurality of computers, or computer systems, including client computers 302(a) . . . (n) (where "n" is any suitable number), a web server 305, and a web scraping and analysis server 306. Computers 302(a) . . . (n), web server 305, and server 306 can also include wired and wireless systems. Data storage, processing, data transfer, and program operation can occur by the inter-operation of the components of network environment 300. For example, a component including a program in server 302(a) can be adapted and arranged to respond to data stored in server 306 and data input from web server 305. This response can occur as a result of preprogrammed instructions and can occur without intervention of an operator.

Network 304 is, for example, any combination of linked computers, or processing devices, adapted to access, transfer and/or process data. Network 304 can be private Internet Protocol (IP) networks, as well as public IP networks, such as the Internet that can utilize World Wide Web (www) browsing functionality, or a combination of private networks and public networks.

In one embodiment, at least some of computers 302(a) . . . (n), web server 305 and server 306 can operate over a wired and/or wireless network, such as networks 304. Generally, computers 302(a) . . . (n), web server 305 and server 306 can include virtually any computer capable of communicating over a network to send and receive information, perform various online activities, offline actions, or the like. In one embodiment, one or more of computers 302(a) . . . (n), web server 305 and server 306 can be configured to operate within a business or other entity to perform a variety of services for the business or other entity. For example, client computers 302(a) . . . (n), web server 305 and server 306 can be configured to operate as a web server, a host server, or the like. However, computers 302(*a*) . . . (*n*), web server 305 and server 306 are not constrained to these services and can also be employed, for example, as an end-user computing node, in other embodiments. It should be recognized that more or less computers can be included in system 1 such as described herein, and embodiments are therefore not constrained by the number or type of client computers employed.

Computers 302(*a*) . . . (*n*), web server 305 and server 306 can include computers that typically connect using a wired or wireless communications medium such as personal computers, multiprocessor systems, microprocessor-based or programmable electronic devices, network PCs, or the like. In some embodiments, computers 302(*a*) . . . (*n*) can include virtually any portable personal computer capable of connecting to another computing device and receiving information such as, servers, a laptop computer, smart mobile telephone, and tablet computers, and the like. However, portable computers are not so limited and can also include other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like.

As such, computers 302(*a*) . . . (*n*), web server 305 and server 306 typically range widely in terms of capabilities and features. Moreover, computers 302(*a*) . . . (*n*), web server 305 and server 306 can access various computing applications, including a browser, or other web-based application.

A web-enabled computer can include a browser application that is configured to receive and to send web pages, web-based messages, and the like. The browser application can be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. In one embodiment, a user of client computer or computer 302(*a*) . . . (*n*) can employ the browser application to perform various activities over a network (online). However, another application can also be used to perform various online activities.

Computers 302(*a*) . . . (*n*), web server 305 and server 306 can also include at least one other client application that is configured to receive and/or send content between another computer. The client application can include a capability to send and/or receive content, or the like. The client application can further provide information that identifies itself, including a type, capability, name, and the like. In one embodiment, computers 302(*a*) . . . (*n*), web server 305 and server 306 can uniquely identify themselves through any of a variety of mechanisms, including an Internet Protocol (IP) address, a phone number, Mobile Identification Number (MIN), an electronic serial number (ESN), or other device identifier. Such information can be provided in a network packet, or the like, sent between other computers.

Network 304 is configured to couple network computers with other computers and/or computing devices, through a wired or wireless network. Network 304 is enabled to employ any form of computer readable media for communicating information from one electronic device to another. Also, network 304 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links in LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links can further employ any of a variety of digital signaling technologies. Furthermore, remote computers and other related electronic devices could be remotely connected to either LANs or WANs via a modem and temporary telephone link. In one embodiment, network 304 can be configured to transport information of an Internet Protocol (IP). In essence, network 304 includes any communication method by which information can travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

The computers 302(*a*) . . . (*n*), web server 305 and server 306 can be operatively connected to a network, via bi-directional communication channel, or interconnector, 308, which can be, for example, a serial bus such as IEEE 1394, or other wire or wireless transmission media. Examples of wireless transmission media include transmission between a modem (not shown), such as a cellular modem, utilizing a wireless communication protocol, or wireless service e provider or a device utilizing a wireless application protocol and a wireless transceiver (not shown). Interconnector 308 can be used to feed, or to provide data.

A wireless network can include any of a variety of wireless sub-networks that can further overlay stand-alone ad-hoc networks, and the like, to provide an infrastructure-oriented connection for computers 302(*a*) . . . (*n*), web server 305 and server 306. Such sub-networks can include mesh networks, Wireless LAN (WLAN) networks, cellular networks, and the like. In one embodiment, system 1 includes more than one wireless network. A wireless network can further include an autonomous system of terminals, gateways, routers, and the like connected by wireless radio links, and the like. These connectors can be configured to move freely and randomly and organize themselves arbitrarily, such that the topology of wireless network may change rapidly. A wireless network can further employ a plurality of access technologies including 2nd (2G), 3rd (3G), 4th (4G) 5th (5G) generation radio access for cellular systems, WLAN, Wireless Router (WR) mesh, and the like. Access technologies, such as 2G, 3G, 4G, 5G, and future access networks can enable wide area coverage for mobile devices, such as client computers, with various degrees of mobility. In one non-limiting example, wireless network enables a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, a wireless network can include virtually any wireless communication mechanism by which information may travel between a computer and another computer, network, and the like.

A computer for the system can be adapted to access data, transmit data to, and receive data from, other computers 302(a) . . . (n), web server 305 and server 306 via the network or network 304. The computers 302(a) . . . (n), web server 305 and server 306 typically utilize a network service provider, such as an Internet Service Provider (ISP) or Application Service Provider (ASP) (ISP and ASP are not shown) to access resources of network 304.

Generalized Operation

The operation of certain embodiments will now be described with respect to FIGS. 3-4. In at least one of various embodiments, processes 100 and 200 described in conjunction with FIGS. 3-4, respectively, can be implemented by and/or executed on a single computer, such as computer 1 of FIG. 1. In other embodiments, these processes or portions of these processes can be implemented by and/or executed on a plurality of computers. Embodiments are not limited, and various combinations of network computers, client computers, virtual machines, hardware devices or the like can be utilized. Further, in at least one of the various embodiments, the processes described in conjunction with FIGS. 3-4 can be operative in system with logical architectures such as those described in conjunction with FIG. 2.

Figure 3:
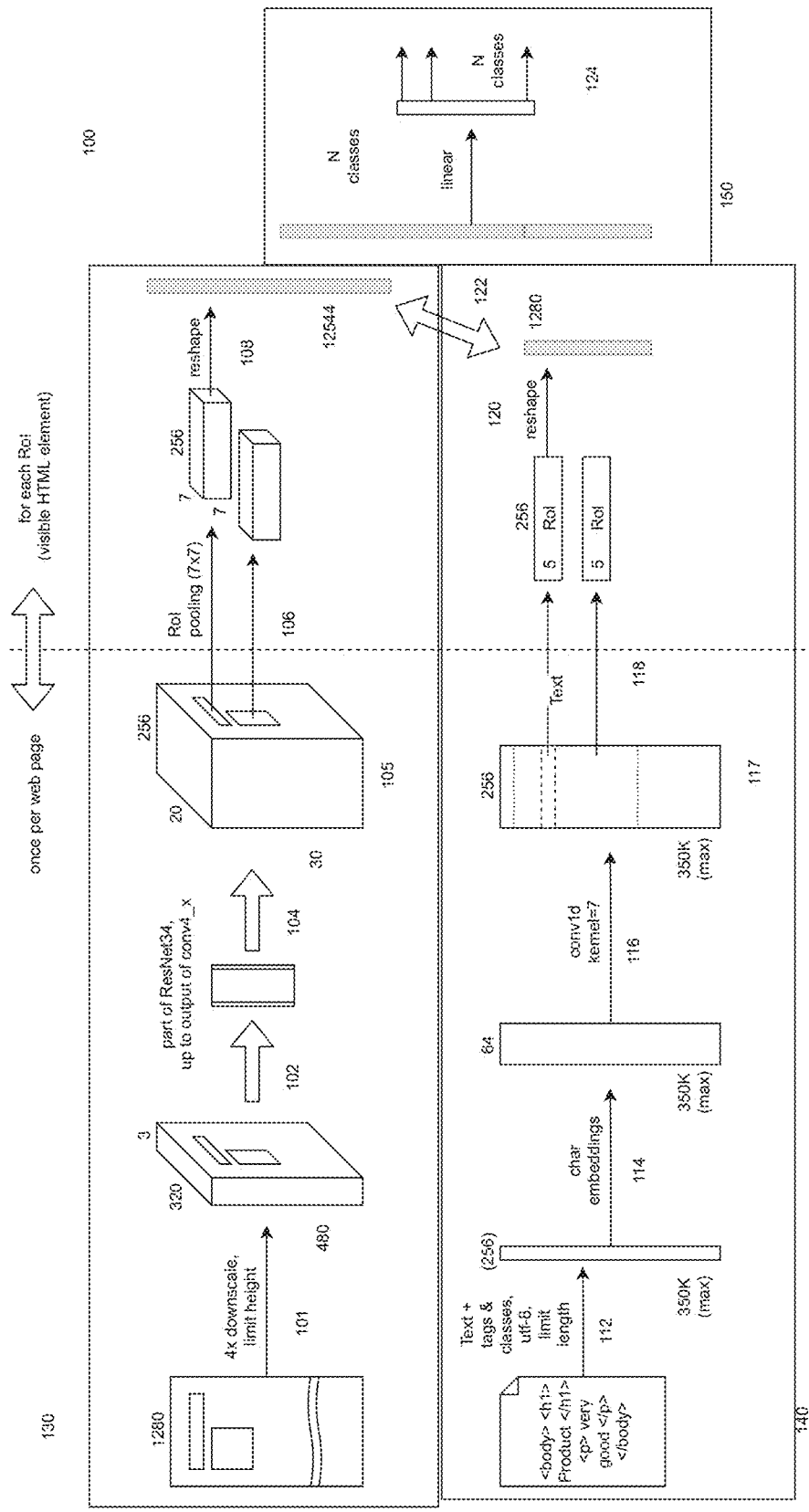
FIG. 3 is a flowchart and architecture for a process in accordance with at least one of the various embodiments.

FIG. 3 illustrates a flowchart for process 100 for performing web page and web page parts analysis and classification in accordance with at least one of the various embodiments. In the embodiment of FIG. 3, there is shown a multi-modal neural network that is trained to do multiple object detection, for extracting information from web pages. As shown in the embodiment, the network can consist of 3 parts: an image processing part 130, a HTML processing part 140, and a classifier 150 including final classification layers. In at least one embodiment, all parts of a neural network can be trained jointly.

In at least one embodiment, all parts of a neural network can be trained jointly. For example, all the parts of the neural network are trained jointly and jointly optimized as a single computational graph: a single global objective function, which depends on parameters of the image processing network, the HTML processing network, and the classifier are optimized. In an embodiment, a gradient is computed with respect to parameters of the image processing part, the HTML processing part and classifier using a single objective function, and parameters are updated according to the optimization algorithm used, such as Stochastic Gradient Descent (SGD) or an Adam optimization algorithm. In at least one embodiment, parts of network can be trained or pre-trained separately, including training using different objective functions and different training datasets. In at least one embodiment, parts of network are pre-trained separately as a first step, and then optimized jointly as a second step.

In an embodiment, image processing part 130 is a modification of Fast R-CNN architecture, which is an architecture of an object detection neural network. At block 101, in at least one embodiment, a screenshot of a web page is obtained, resized and truncated to a fixed size. In the exemplary embodiment shown in FIG. 3, an RGB-color web page screenshot with a fixed width of 1280 and any height is resized and truncated to a fixed 320×480 resolution. At block 102, in at least one embodiment, the resized and truncated screenshot of a web page is processed through a convolutional neural network (CNN) to produce a representation of a web page. Examples of a CNN that can be employed are VGG16, Inception v3, ResNet-34, ResNet50, MobileNet, or parts of these or similar networks. Initial weights of these networks can be set randomly, according to commonly used approaches (such as a Glorot initialization) or can be obtained from pre-training a network on a different task, for example on ImageNet classification. In an embodiment, a part of ResNet34 is used, with initial parameters set to those of a network pre-trained on ImageNet classification task. The CNN produces a 3D feature map that corresponds to the input image, but can have a different size and a different depth than the input image. Each area of the input image has a corresponding area on the feature map. In an embodiment, 20×30×256 feature map is produced.

At block 105, candidate rectangular regions of the input image, regions of interest (RoI), are generated. RoIs are parts of the web page from which to extract data. A region on the input image is mapped to a region on a feature map. At block 106, each RoI on a feature map is then resized to a fixed size, keeping the same depth of the feature map, using a process called RoI pooling (Region of Interest pooling). In at least one embodiment, an RoIAlign algorithm is used to resize regions. In an embodiment, as shown in FIG. 3, the size after resizing is 7×7×256. In at least one embodiment, size after the resizing is 3×3×256. At a block 108, parameters of each region are then passed as an input to final classification layers 150.

An exemplary advantage of the present disclosed embodiment is the use of HTML element and other part of web page measurements in a process of generating candidate regions of interest (RoIs). In at least one embodiment, proposed RoIs are bounding boxes of HTML elements, in which coordinates and visibility are measured by a script executed in a browser. The system is configured to employ image processing to do object detection, but has the advantage that, unlike conventional image processing for video and camera images, in the case of web page extraction additional information about possible bounding boxes is available in the web page.

In at least one embodiment, the web scraping and classification engine is configured to jointly process HTML from the web page and a screenshot of the same web page. Block 140 in FIG. 3 shows an embodiment of the HTML processing part.

At block 112, a raw HTML snapshot is processed: text, HTML tags from a fixed set of tags, and CSS class attributes are preserved, while other information is removed. As disclosed hereinafter, other kinds of HTML processing are possible. The result is encoded to a byte string, for example using UTF-8 encoding. The length of the result is limited by truncating byte string in the end. For example, a limit can be set to 350 KB.

At block 114, character embedding layer is used to convert the byte string to a 2D tensor, where each byte from the byte string is represented by 1D vector of certain size, for example size 64. The resulting 2D tensor is then processed to get a 2D feature map. For example, the 2D tensor can be processed using 1D convolutional neural network layers, Recurrent Neural Network layers (RNNs and their variants LSTM or GRU), or other like neural networks. In at least one embodiment, at block 116, resulting 2D tensor is processed using a 1D convolution layer with kernel size 7, which produces a 2D feature map. The length of the 2D feature map produced in this embodiment is the same as length of the input byte string, and depth is a parameter which can be chosen (for example, in an embodiment, the depth is set to 256).

At block 117, candidate RoIs to extract data from are generated. These regions of interest are parts of the input HTML. Each region of interest of the input HTML corresponds to a region of interest on the byte string, and, accordingly, to a region of interest on a 2D feature map. In block 118, regions on a 2D feature map are then resized to a fixed length (5 in the embodiment), keeping depth of a feature map and using RoI pooling or a similar algorithm. Other fixed lengths are possible, including length 1. At block 120, output parameters for each region are then used as an input to final classification layers 150.

An exemplary non-limiting advantage of the embodiment is the use of the candidate regions of interest that correspond to the same parts of web page in image processing part 130 and HTML processing part 140. In an embodiment, this is implemented by having a candidate region of interest for each HTML element potentially visible to a user on a web page: on-screen coordinates and visibility of such element are used to create candidate region for the image processing part 130, and a part of the HTML that corresponds to the same element becomes a region of interest for the HTML processing part 140. As shown on block 122, this??? allows to pass outputs of HTML processing part 140 as an input to the final classification layers 150 jointly with outputs of image processing part 130, as both outputs contain information about the same part of the web page.

An exemplary advantage of the disclosed embodiment is computational efficiency. For instance, blocks 101, 102, 104, 112, 114, 116 and 118, which represent heavy computations, can be executed only once per web page, not once per candidate part of a web page (i.e. the region of interest), to extract data from. In additional to computational efficiency, this has a benefit of parameter sharing, which can improve classification quality.

Given an input from the image processing part 130 and HTML processing part 140, the final classification layers 150 outputs a probability score that a part of a web page belongs to a certain class, for all classes from a fixed list. For example, web scraping and classification engine can be configured and trained to identify article data, for example, Article Text, Author, Published Date, Headline. A special class, for example, Background, can used for web page parts which do not belong to any class of interest. Another example is identification of e-commerce product attributes, for example Price, Currency, Product Name, SKU number, Breadcrumbs, Product Description, Main Image, Background. A special case, when a region of interest is the whole page, is classifying the whole web page, for example as an individual Product page or not. As will be appreciated, the embodiments as described herein can train on web pages to identify areas and items of interest based upon the purpose of the site and page.

In the embodiment shown on FIG. 3, at block 124, the classification approach used in the final classification layers 150 can include binary Logistic Regression classifiers, one for each possible target class such as Article Text, Author, Headline and alike. This means a multi-label classification of web page parts is performed for each part of a web page more than one class can be predicted. In this case, the result of classification of each part of a web page could be a list of probabilities for predefined article classes: Article Text=0.8, Author=0.3, Headline=0.0; these probabilities do not have to sum to 1. Such list of probability values is computed for every web page parts. In another embodiment, multinomial logistic regression can be used, where for each part of the web page only a single class is predicted. In this case, the result of classification is a list of probability values per each part of a web page, but probabilities for all classes must sum to 1 in each list, for example Article Text=0.7, Author=0.2, Headline=0.1. In another embodiment, a non-probabilistic classifier can be used, which outputs only the predicted class for each part of a web page, for example Author, or predicted classes in case of multi-label classification, e.g. Author, Headline. As discussed hereinafter, other classification methods can be used in the final classification layer, including deep neural networks.

FIG. 4 is an overview flowchart for process 200 for performing web page extraction and classification in accordance with at least one of the various embodiments. As shown in FIG. 4, a multi-modal neural network is trained to do multiple object detection, for the purpose of extracting information from web pages. The network has the same 3 parts as described with respect to FIG. 3: an image processing part 135, HTML processing part 145, and a classifier 155 including final classification layers.

Image processing part 135 proceeds in the same manner as described with respect to FIG. 3 in the image processing part 130, with one difference: the size regions of interest (RoI) are resized at block 106 to 3×3×256 instead of 7×7×256.

HTML processing part 145 as shown in FIG. 4 is configured for the same purpose as HTML processing part 140 on FIG. 3 but is implemented in a different way. As shown in FIG. 4, text processing and HTML structure processing flows are separated. Also, a more complex text processing architecture is used.

At block 212, the engine extracts text content from HTML, without any HTML tags or attributes. This text is encoded to a byte string, for example using UTF-8 encoding. A length of the bytes string is limited from the end, for example to 50 KB.

At block 214, a bytes string is processed using a series of neural network layers. In at least one embodiment, at block 214, the flow can be as follows: character embeddings layer (similar to block 114 on FIG. 3), then, at block 216 two 1D convolution layers (kernel size 3) with ReLU activation functions after each convolutional layer, then a max pooling layer (kernel size 2, stride 2), then two more 1D convolution layers (kernel size 3), with ReLU activation after each convolutional layer, and then upscaling the result by factor 2. Next, a skip connection is added: input of the max pooling layer is added to the upscaling result element-wise. The result is passed through two more 1D convolution layers (kernel size 3), with ReLU activation after the first of these 1D convolution layers. The result of this processing at block 216 is a 2D feature map, similar in shape and purpose to a feature map produced in block 116 on FIG. 3. In at least one embodiment, length of the feature map is the same as the input bytes string length, and a depth is set to 256. In at least one embodiment, after a processing at block 214, a length of the feature map can be greater or smaller than length of the input bytes string. For example, a feature map can be 2 times shorter than the input bytes string: in this case each row on a feature map corresponds to two bytes in the input bytes string.

In FIG. 4, candidate regions of interest are generated and mapped on the 2D feature map in the same manner as described with respect to FIG. 3.

At blocks 218 and 222, each region of interest on the 2D feature map is resized to a fixed size (which is 3 in at least one embodiment), preserving the depth of a feature map. For each RoI, the resulting feature vector is then passed as an input to final classification layers 155.

Also, at blocks 218 and 222, for each region of interest a left context is taken, which is a fixed number of rows on a 2D feature map preceding a row on a 2D feature map in which this RoI starts. In at least one embodiment, up to 64 rows are taken when 2D feature map is of the same size as input byte string, whereby up to 64 bytes before an element is taken in account, which is advantageous when the preceding text is helpful for classification. A left context is then resized to a fixed size (which is 2 in at least one embodiment) using the same RoI pooling method as for resizing of the candidate regions of interest. For each RoI, the resulting feature vector is then passed as an input to final classification layers 155.

At block 204 for each possible HTML tag (e.g.: div, a, p, span), an embedding is computed during the training, which is a vector of a fixed size (32 in at least one embodiment). For each RoI, a HTML tag is extracted, and then looked up in the embeddings table, which produces a feature vector representing HTML tag for the RoI. For each RoI resulting feature vector is then passed as an input to final classification layers 155.

In block 207, for the most popular (according to the training database) CSS classes or IDs, an embedding is computed during the training, which is a vector of fixed size (128 in an embodiment). In an embodiment, 1024 most popular CSS classes or IDs are processed. Then for each RoI, all CSS classes and IDs are extracted, their embeddings are looked up, and then an average is computed element-wise, to produce a feature vector representing CSS classes and IDs for each RoI. Each RoI resulting feature vector is then passed as an input to final classification layers 155.

For each RoI, the final classification layers 155 receives feature vectors from the image processing part 135 and HTML processing part 145. At blocks 224 and 226, final classification layers 155 are similar in purpose to those described at block 124 FIG. 3, but instead of a Logistic Regression classifier, at block 226 a deep neural network is used. In an embodiment, at block 226 a neural network with two fully connected layers is used, with Batch Normalization layers enabled, ReLU activation function, and Dropout regularization.

An exemplary advantage of the present embodiment is an ability to jointly and efficiently use image information and text of the web page and HTML structure of a web page for the final classification. Unlike pure image-based solutions, the neural network in this embodiment does not need to perform Optical Character Recognition (OCR) in order to obtain text which corresponds to a particular area of a web page (of a screenshot), as this text is readily available, as well as other information like structural HTML features. An exemplary advantage of the present embodiment is the employment of Machine Learning-based image, text and HTML structure processing on web pages to affect an improvement over conventional web-scraping technology.

It will be understood that each block of the flowchart illustration, and combinations of blocks in the flowchart illustration, can be implemented by computer program instructions. These program instructions can be provided to a processor to produce a machine, so that the instructions, which execute on the processor, create means for implementing the actions specified in the flowchart block or blocks. The computer program instructions can be executed by a processor to cause a series of operational steps to be performed by the processor to produce a computer-implemented process such that the instructions, which execute on the processor to provide steps for implementing the actions specified in the flowchart block or blocks. The computer program instructions can also cause at least some of the operational steps shown in the blocks of the flowchart to be performed in parallel. Moreover, some steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the present innovations.

Accordingly, blocks of the flowchart illustration support combinations of ways for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. Special purpose hardware can include, but is not limited to, graphical processing units (GPUs) or AI accelerator application-specific integrated circuits. The foregoing example should not be construed as limiting and/or exhaustive, but rather, an illustrative use case to show an implementation of at least one of the various embodiments of the present innovations.

The invention claimed is:

1. A system for scraping and processing a web page, comprising:
   a computer comprising a memory including non-transitory program memory for storing at least instructions and a processor device that is operative to execute instructions that enable actions, the processor device comprising:
   extracting a web page from a website;
   obtaining a screenshot image of the web page;
   processing the screenshot image of the web page with an object detection neural net to obtain feature vectors for one or more image regions of interest on the screenshot image of the web page;
   extracting HTML text from the web page;
   processing the HTML text from the web page with the neural net to obtain feature vectors for one or more HTML regions of interest; and
   classifying the one or more image regions of interest and the one or more HTML regions of interest with a classifier.

2. The system of claim 1, wherein the one or more image regions of interest and the one or more HTML regions of interest are generated based on measurements performed inside a web browser engine.

3. The system of claim 1, wherein,
   the one or more image regions of interest and the one or more HTML regions of interest are pointing to the same or overlapping parts of the web page; and
   the classifier uses combined feature vectors from the one or more image regions of interest and the one or more HTML regions of interest to classify parts of the web page, to obtain one or more classes for each part of the web page.

4. The system of claim 3, wherein the image object detection neural network and the HTML processing neural network are combined into a single neural network computation graph and trained jointly.

5. The system of claim 4, wherein the image object detection neural network, the HTML processing neural network and the classifier are combined into a single neural network computation graph and trained jointly.

6. The system of claim 1, wherein processor device is operative to execute instructions further comprising:
resizing the screenshot image of the web page;
processing the resized screenshot image of the web page with the neural net to produce an image feature map representing the web page, the image feature map comprising the one or more image regions of interest mapped to the image feature map; and
processing each of the one or more regions of interest of the image feature map into one or more image region of interest parameters for classification by the classifier.

7. The system of claim 6, wherein processor device is operative to execute instructions further comprising:
processing the HTML text and structural information from the web page with the neural net to produce an HTML feature map representing the web page, the HTML feature map comprising the one or more HTML regions of interest mapped to the HTML feature map; and
processing each of the one or more HTML regions of interest of the HTML feature map into one or more of HTML region of interest parameters for classification by the classifier.

8. The system of claim 7, wherein the neural net for processing HTML text and structure is a convolutional neural net or a recurrent neural net.

9. The system of claim 7, wherein the HTML regions of interest are processed into the HTML region of interest parameters for classification using region of interest pooling.

10. The system of claim 6, wherein the neural net for processing the resized screenshot image of the web page comprises a convolutional neural net.

11. The system of claim 10, wherein the convolutional neural net is a Residual Neural Net.

12. The system of claim 6, wherein the image regions of interest are processed into the image region of interest parameters for classification using region of interest pooling.

13. The system of claim 1, wherein processor device is operative to execute instructions further comprising extracting textual content from the web page HTML prior to processing the HTML text with the neural net.

14. The system of claim 1, wherein the processor is operative to perform further actions comprising outputting a probability score that a part of the web page belongs to a defined class.

15. The system of claim 1, wherein the classifier is selected from at least one of a logistic regression classifier, a decision tree, a conditional random field, a propositional rule learner, or a neural network.

16. The system of claim 1, wherein the system is configured to perform the image processing and the HTML processing in parallel.

17. A method for scraping and processing a web page, the method being performed by a computer system that comprises one or more processors and a computer-readable storage medium encoded with instructions executable by at least one of the processors and operatively coupled to at least one of the processors, the method comprising:
extracting a web page from a website;
obtaining a screenshot image of the web page;
processing the screenshot image of the web page with an object detection neural net to obtain feature vectors for one or more image regions of interest on the screenshot image of the web page;
extracting HTML text from the web page;
processing the HTML text from the web page with the neural net to obtain feature vectors for one or more HTML regions of interest; and
classifying the one or more image regions of interest and the one or more HTML regions of interest with a classifier.

18. The method of claim 17, further comprising generating the one or more image regions of interest and the one or more HTML regions of interest based on measurements performed inside a web browser engine.

19. The method of claim 17, wherein:
the one or more image regions of interest and the one or more HTML regions of interest are pointing to the same or overlapping parts of a web page; and
the classifier uses combined feature vectors from the one or more image regions of interest and the one or more HTML regions of interest to classify parts of web page, to obtain one or more classes for each part of the web page.

20. The method of claim 17, further comprising:
combining the image object detection neural network and the HTML processing neural network into a single neural network computation graph; and
training the image object detection neural network and the HTML processing neural network jointly.

21. The method of claim 20, further comprising:
combining the image object detection neural network, the HTML processing neural network and the classifier into a single neural network computation graph; and
training the image object detection neural network, the HTML processing neural network, and the classifier jointly.

22. The method of claim 17, further comprising:
resizing the image of the web page;
processing the resized screenshot image of the web page with the neural net to produce an image feature map representing the web page, the image feature map comprising the one or more image regions of interest mapped to the image feature map; and
processing each of the one or more regions of interest of the image feature map into one or more image region of interest parameters for classification by the classifier.

23. The method of claim 22, further comprising:
processing the HTML text and structural information from the web page with the neural net to produce an HTML feature map representing the web page, the HTML feature map comprising the one or more HTML regions of interest mapped to the HTML feature map; and
processing each of the one or more HTML regions of interest of the HTML feature map into one or more of HTML region of interest parameters for classification by the classifier.

24. The method of claim 23, wherein the neural net for processing HTML text and structure is a convolutional neural net or a recurrent neural net.

25. The method of claim 23, wherein the HTML regions of interest are processed into the HTML region of interest parameters for classification using region of interest pooling.

26. The method of claim 22, further comprising processing the resized screenshot image of the web page with a convolutional neural net.

27. The method of claim 26, wherein the convolutional neural net is a Residual Neural Net.

28. The method of claim 22 wherein the image regions of interest are processed into the image region of interest parameters for classification using region of interest pooling.

29. The method of claim 17, further comprising extracting textual content from the web page HTML prior to processing the HTML text with the neural net.

30. The method of claim 17, further comprising outputting a probability score that a part of the web page belongs to a defined class.

31. The method of claim 17, further comprising performing the image processing and the HTML processing in parallel.

32. A computer program product comprising a non-transitory computer-readable storage medium encoded with instructions that, when executed by at least one processor within a computer system that comprises one or more processors and a memory operatively coupled to at least one of the processors, cause the computer system at least to:
- extracting a web page from a website;
- obtain a screenshot image of a web page;
- process the screenshot image of the web page with an object detection neural net to obtain feature vectors for one or more image regions of interest on the image of the web page;
- extract HTML text from the web page;
- process the HTML text from the web page with the neural net to obtain feature vectors for one or more HTML regions of interest; and
- classify the one or more image regions of interest and the one or more HTML regions of interest with a classifier.

* * * * *